W. K. STEVENS.
AGRICULTURAL BOILER.

No. 178,974. Patented June 20, 1876.

Witnesses:
Chas. Gill
R. A. Gill

Inventor:
Wm. K. Stevens
by his Atty.
Cox & Cox.

N. PETERS, PHOTO-LITHOGRAPHER, WASHINGTON, D.C.

UNITED STATES PATENT OFFICE.

WILLIAM K. STEVENS, OF MANSFIELD, OHIO, ASSIGNOR OF PART OF HIS RIGHT TO HENRY R. NIMAN, CALVIN DOTY, JOHN B. NIMAN, AND JAMES A. NIMAN, OF SAME PLACE.

IMPROVEMENT IN AGRICULTURAL BOILERS.

Specification forming part of Letters Patent No. 178,974, dated June 20, 1876; application filed February 16, 1876.

*To all whom it may concern:*

Be it known that I, WILLIAM K. STEVENS, of Mansfield, in the county of Richland and State of Ohio, have invented a new and useful Improvement in Agricultural Steamers and Boilers, of which the following is a specification, reference being had to the accompanying drawings.

The invention relates to an improvement in steamers and boilers which are employed for steaming or cooking food for stock and other farm uses; and consists in the devices hereinafter specifically described.

The object of the invention is to provide an efficient steamer and boiler for the use of agriculturists.

Figure 1:
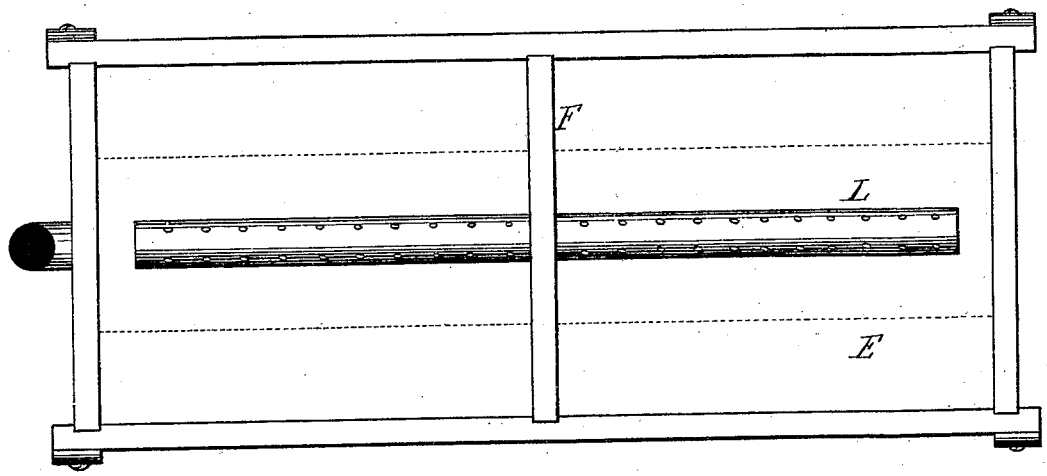
Figure 2:
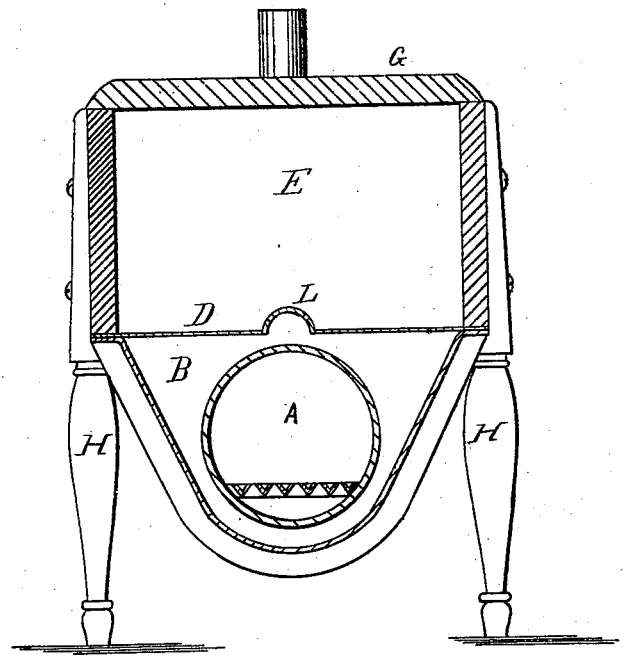

Figure 1 is a top elevation of a device embodying the elements of the invention. Fig. 2 is a transverse section of same.

In the accompanying drawings, A represents a furnace, provided with a door at one end and a flue at the other, and suspended at each end in a water-chamber, B, whereat alone the chamber and furnace touch. The walls of the chamber flare upward and outward, having a flange on their edges, which is bolted through the edge of the plate D to the lower edge of the tank E. The plate D forms the top of the water-chamber B and the bottom of the tank E, and is provided with one or more longitudinal arches, L, which are perforated and placed in lines parallel with the sides of the tank E, which is an elongated vessel, and made of wood, as it does not come in contact with any portion of the metallic surfaces, which are heated by the direct action of fire.

The tank may be divided into any number of receptacles by transverse partitions F, in which, at one operation, several different kinds of food may be simultaneously prepared, and is furnished with a suitable cover, G.

The whole device is properly supported by the legs H, attached at the corners of the tank.

Operation: To use the machine for steaming, it is only necessary to fill the water-chamber and kindle the fire in the furnace. The steam arising through the apertures in the arch L into the tank E, and confined therein, will effect the purpose.

To operate the device as a boiler, it is only necessary to properly fill both tank and water-chamber and kindle the fire in the furnace.

What I claim as my invention, and desire to secure by Letters Patent, is—

In an agricultural boiler, the plate D, covering the area of the device, and provided with the perforated arch L, in combination with the water tank or chamber B, having the furnace A extending throughout its entire length and suspended in the tank, substantially as set forth.

In testimony that I claim the foregoing improvement in agricultural steamers and boilers, as above described, I have hereunto set my hand this 11th day of February, 1876.

WILLIAM K. STEVENS.

Witnesses:
HENRY C. HEDGES,
WILLIAM M. HAHN.